(12) United States Patent
Ogihara et al.

(10) Patent No.: US 6,262,958 B1
(45) Date of Patent: Jul. 17, 2001

(54) TRANSMISSION CABLE, JACK TO WHICH TRANSMISSION CABLE IS INSERTED, AND RECORDED

(75) Inventors: Akira Ogihara; Kissei Matsumoto, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/609,536

(22) Filed: Jun. 30, 2000

Related U.S. Application Data (62) Division of application No. 09/071,772, filed on May 1, 1998.

(30) Foreign Application Priority Data

May 21, 1997 (JP) .................................................. 9-131377

(51) Int. Cl.[7] ........................................................ G11B 7/00
(52) U.S. Cl. .................... 369/53.44; 369/84; 369/47.12; 369/59.24; 385/88; 439/669
(58) Field of Search ................... 369/83, 84, 112, 369/47, 54, 49, 59; 385/72–78, 88–94, 101–109; 439/607–610, 668, 669

(56) References Cited

U.S. PATENT DOCUMENTS

| | | | |
|---|---|---|---|
| 4,846,719 | * | 7/1989 | Iwashita .............................. 385/88 |
| 4,869,566 | * | 9/1989 | Juso et al. ............................ 385/53 |
| 5,352,995 | * | 10/1994 | Mouissie ............................. 439/620 |
| 5,539,851 | * | 7/1996 | Taylor et al. ....................... 385/101 |
| 5,790,498 | * | 8/1998 | Jeong ................................... 369/84 |
| 5,812,512 | * | 9/1998 | Tobita et al. .......................... 369/84 |

FOREIGN PATENT DOCUMENTS

0053482 * 6/1982 (EP) .
9642122 * 12/1996 (WO) .

* cited by examiner

Primary Examiner—Thang V. Tran
(74) Attorney, Agent, or Firm—Ronald P. Kananen; Rader, Fishman & Grauer (57) ABSTRACT

A jack is provided to be inserted with a cable dedicated to analog transmission, a cable dedicated to digital transmission, and a cable dedicated to analog and digital transmissions. A recording device is also provided to have the jack and a cable identifying unit so that the signal to be recorded is automatically switched according to the transmitted digital signal and the cable identified result given by the cable identifying unit.

8 Claims, 5 Drawing Sheets

FIG.5

TRANSMISSION CABLE, JACK TO WHICH TRANSMISSION CABLE IS INSERTED, AND RECORDED This application is a divisional of application Ser. No. 09/071,772 filed May 1, 1998.

BACKGROUND OF THE INVENTION

1. Field of the Invention

The present invention relates to a transmission cable for transmitting both an analog signal and a digital signal, a jack to be connected to the transmission cable, and a recording device connected to the transmission cable and the jack and for recording data on a recording medium.

2. Background of the Invention

Conventionally, when dubbing an audio signal on a recording medium loaded in a recording device, a reproducing device is electrically connected to the recording device for transmitting the audio signal. For transferring an information signal, the transmission cable is connected between the recording device and the reproducing device. As such, when dubbing the audio signal, the transmission cables connected among the electronic devices include an analog cable for transmitting an analog signal, a digital cable for transmitting a digital signal, and an optical cable for transmitting a digital light signal.

When dubbing a signal from a first optical disc dedicated to reproduction to a second recordable and reproducible optical disc through these analog, digital, and optical cables, the first electronic device to which the first optical disc is loaded is connected to the second electronic device to which the second optical disc is loaded through those cables, for the purpose of transmitting a signal from the first electronic device to the second electronic device.

When dubbing a signal from the first optical disc to the second optical disc, the signal can be digitally dubbed onto the second optical disc. However, the dubbing of the digital signal from the second optical disc to the third recordable and reproducible optical disc is strictly restricted and thus is made substantially impossible. That is, the digital dubbing to the first generation is enabled, while the digital dubbing to the second generation is prohibited in light of the copyright. If a user would like to dub a signal to the second optical disc, the user is permitted to dub the signal in an analog manner.

Hence, the second electronic device is required to provide a capability of transmitting and receiving a digital signal and an analog signal. Further, when the first electronic device transmits a signal to the second electronic device for dubbing the signal recorded on the first optical disc to the second optical disc, some users do not prefer to digitally dub the signal on the second optical disc but prefer to analogously dub the signal thereon. Hence, the first electronic device is required to provide a capability of transmitting and receiving a digital signal and an analog signal.

As described above, the second electronic device to which the second optical disc is loaded is required to provide a capability of transmitting and receiving a digital signal and an analog signal. Hence, the second electronic device provides a jack having a capability of transmitting and receiving a digital signal and an analog signal. The digital cable, the analog cable and the optical cable provide at their tips plugs designed to fit into the jack, so that the jack may be connected to the digital cable and the analog cable.

By providing the jack fitted to each system, the second electronic device may be reduced in size. This jack contains two types for a signal input and a signal output. Though the jack has one mechanical structure, the jack type for a signal output provides a laser diode for transmitting a light signal, while the jack type for a signal input provides a photo detector for receiving a light signal.

However, the user who uses the electronic device provided with this type of jack possesses both of the optical cable and the analog cable. For example, when dubbing the signal recorded on the first optical disc loaded on the first electronic device onto the second optical disc loaded on the second electronic device in a digital manner, the optical cable is inserted into the jack. On the other hand, when dubbing the signal recorded on the first optical disc in an analog manner, it is necessary to replace the optical cable with the analog cable. That is, when the user wants to dub the signal, the user is requested to replace one cable with another when selecting the digital system or the analog system.

Further, when dubbing the signal from the first optical disc to the second optical disc in an analog manner, an unfavorable matter takes place where the additional information such as digital text information recorded on the first optical disc cannot be dubbed at a time.

SUMMARY OF THE INVENTION

It is an object of the present invention to provide a transmission cable which enables to transmit an analog signal and a digital signal, a jack to be connected to this transmission cable, and a recording device.

In carrying out the object, the transmission cable according to the present invention includes a plug having a hole formed at the tip of a projection located on the center thereof and through which a digital signal is inputted and outputted and a terminal section located on the side of the hole and for outputting an analog signal, a digital signal transmission line for transmitting a digital signal to be inputted or outputted from the hole, and an analog signal transmission line for transmitting an analog signal to be inputted or outputted from the terminal section. This transmission cable enables to transmit the analog signal as well as the digital signal at a time.

The jack according to the present invention includes a first plug through which the digital signal and the analog signal are inputted and outputted, a second plug having the substantially same form as the first plug and through which only the analog signal is inputted and outputted, an analog signal I/O portion selectively connected with a third plug through which only a digital signal is inputted and outputted and through which the analog signal is inputted and outputted, a digital signal I/O portion through which the digital signal outputted from the first plug is inputted and outputted, and identifying means for identifying which of the first plug, the second plug and the third plug is inserted. The jack provides a capability of transmitting and receiving both the analog signal and the digital signal.

Further, the recording device according to the present invention includes a jack to be selectively connected with a first plug through which a digital signal and an analog signal are inputted and outputted, a second plug having the substantially same form as the first plug and through which only the analog signal is inputted and outputted, and a third plug through which only the digital signal is inputted and outputted, an analog signal I/O portion to which the analog signal inputted or outputted from the first or the second plug is inputted, a digital signal input unit to which the digital signal inputted or outputted from the first or the third plug is inputted, identifying means for identifying which of the first, the second and the third plugs is connected, converting means for converting the inputted signal into a recording signal to be recorded on the recording medium according to the identified result of the identifying means, and recording means for recording the recording signal converted by the converting means onto the recording medium. The recording device may be inputted with the analog signal transmitted thereto and inputted with or output the digital signal. Hence, this recording device enables to record any signal, that is, an analog signal or a digital signal onto the recording medium.

DESCRIPTION OF THE PREFERRED EMBODIMENTS

Hereafter, a transmission cable, a jack to be connected with the transmission cable and a recording device according to the invention will be described with reference to the appended drawings.

Figure 1:
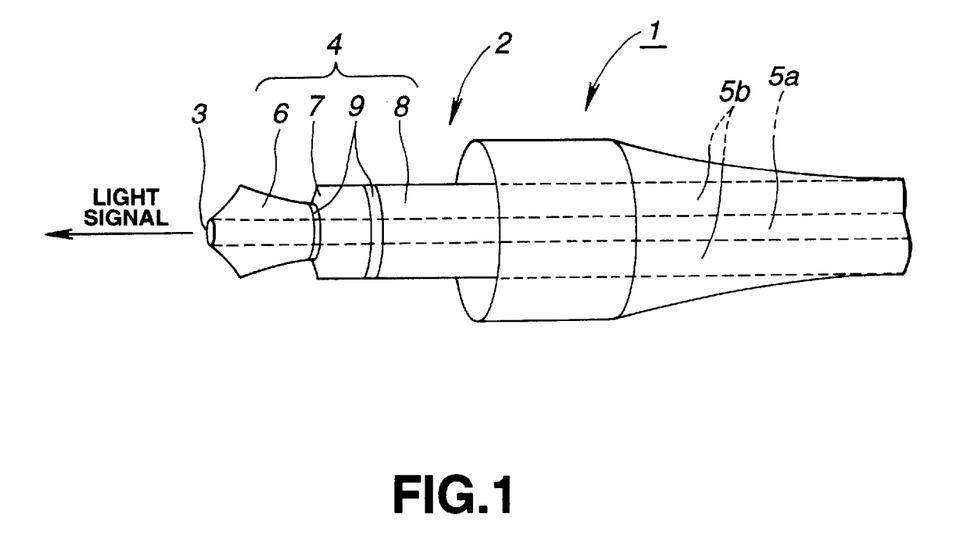
FIG. 1 is a side view showing a cable for outputting an analog and a digital signals to which the invention of the present application is applied.

The transmission cable has a form as shown in FIG. 1, for example. It may apply to the transmission cable used in dubbing an information signal recorded on the recording medium loaded in the recording device onto the recording medium loaded on another recording device.

The transmission cable 1, as shown in FIG. 1, provides a plug 2 to be connected with a jack of the recording device (to be described below) at the end. This plug 2 is composed of a hole 3 formed at one end and from which a digital signal is inputted and outputted, and a terminal section 4 located on the side of the hole 3 and from which the analog signal is inputted and outputted.

The transmission cable 1 provides a digital signal transmission line 5a for transmitting a digital light signal and an analog signal transmission line 5b for transmitting an analog signal at the other end of the plug 2. The digital signal transmission line 5a and the analog signal transmission line 5b are unified into one cable and then is connected to the other end of the plug 2.

This digital signal transmission line 5a is composed of an optical cable for transmitting a digital light signal. In addition, this digital signal transmission line 5a may be a line allowing a modulated radio wave to be transmitted.

The hole 3 is formed in the substantially center of the projection formed at one end of the plug 2. This hole 3 is connected with the optical cable so that the hole 3 may emit a digital light signal. The light signal fired by the hole 3 is a light signal fired from a laser diode and is detected by a photo detector of the jack (to be discussed below) in the state of connecting the plug 2 with the jack.

The terminal section 4 is formed on the outer peripheral side of the hole and provides a Lch terminal 6, a Rch terminal 7 and a GND terminal 8. Between the adjacent terminals are located an insulating portions 9. The Lch terminal 6, the Rch terminal 7, and the GND terminal 8 are made of a conductive material. In the state of connecting the plug 2 to the jack, the analog signal transmitted from the analog signal transmission line is transmitted to the jack. The plug 2 provides an insulating portion 9 made of an insulating material for electrically insulating the Lch terminal 6, the Rch terminal 7 and the GND terminal 8 from one another.

The transmission cable 1 composed as described above provides the plug 2 having the hole 3 for outputting a digital light signal and the terminal section 4 for outputting an analog signal. Hence, the transmission cable 1 enables to transmit both an analog signal and a digital signal. It means that unlike the prior art, this transmission cable 1 provides a capability of transmitting the digital signal and the analog signal on one cable without having to use two cables for the digital signal and the analog signal.

In turn, the description will be oriented to the jack to be connected with the transmission cable.

In the following description about the jack, the plug 2 composing the transmission cable 1 is referred to as a first plug 2. The plug composing the transmission cable for transmitting only the analog signal and having the substantially same form as the first plug 2 is referred to as a second plug 10. The plug composing the transmission cable for transmitting only a digital light signal is referred to as a third plug 11. The jack to be described below may be inserted with the three types of plugs, concretely, the first plug 2, the second plug 10, and the third plug 11. The insertion of the first plug 2, the second plug 10 and the third plug 11 to the jack allows the signal to be inputted from and outputted to the jack.

Figure 2:
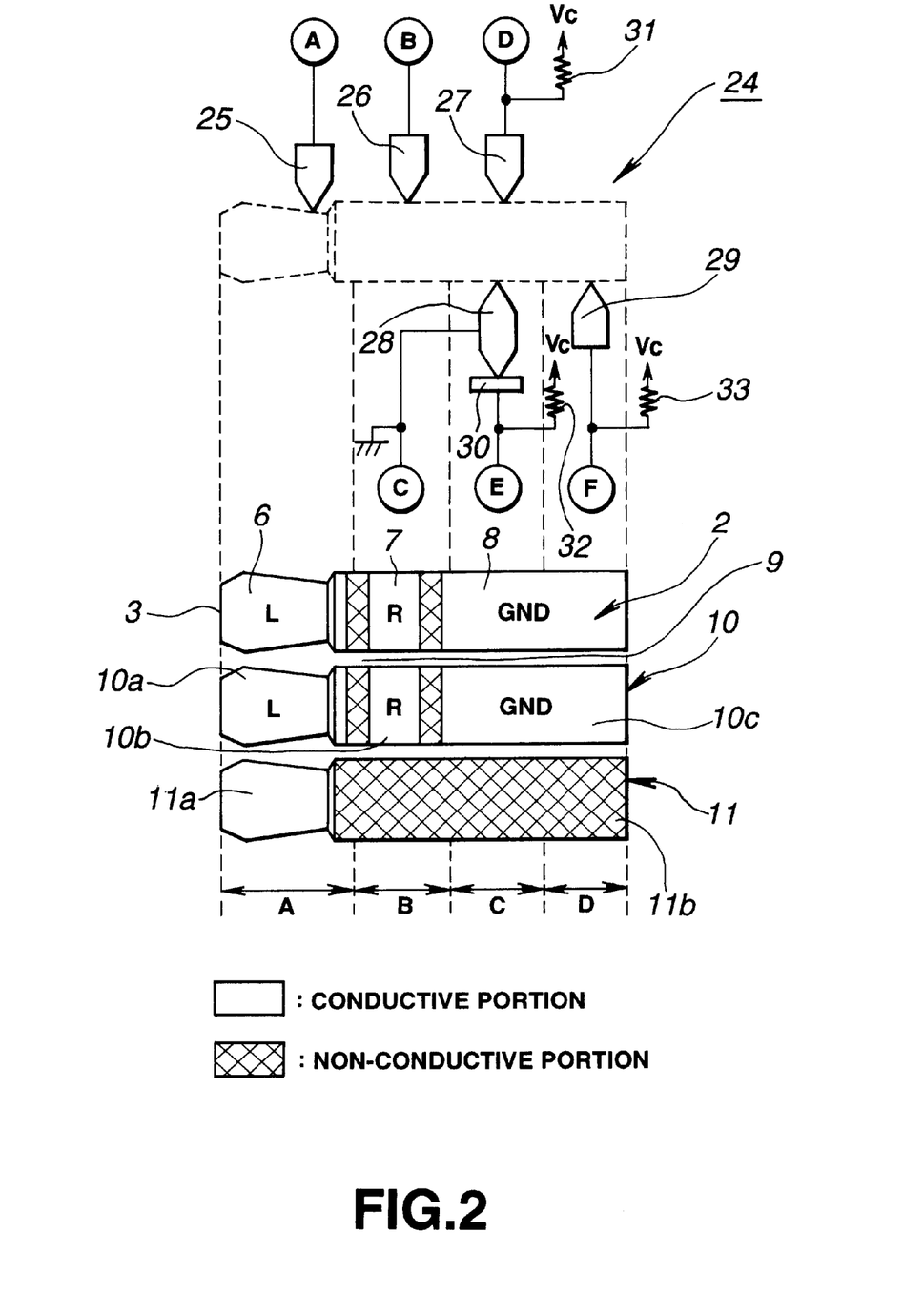
FIG. 2 is a view showing three types of plugs and an identifying structure to which the invention of the present application is applied.

As shown in FIG. 2, the second plug 10 has the substantially same form as the first plug 2 and provides the Lch terminal 10a, the Rch terminal 10b and the GND terminal 10c. The insulating portion 9 is located between the adjacent terminals. Unlike the first plug 2, the second plug 10 does not provide the hole 3 for inputting and outputting a light signal. That is, the second plug 10 provides a capability of transmitting only the analog signal.

In the third plug 11, the portions corresponding to the Lch terminals 6, 10a and the Rch terminals 7, 10b and the GND terminals 8, 10c of the first plug 2 and the second plug are made of a conductive material. Then, like the first plug 2, the third plug 11 has a hole formed at the tip, to and from which hole the light signal is allowed to be inputted and outputted.

Figure 3:
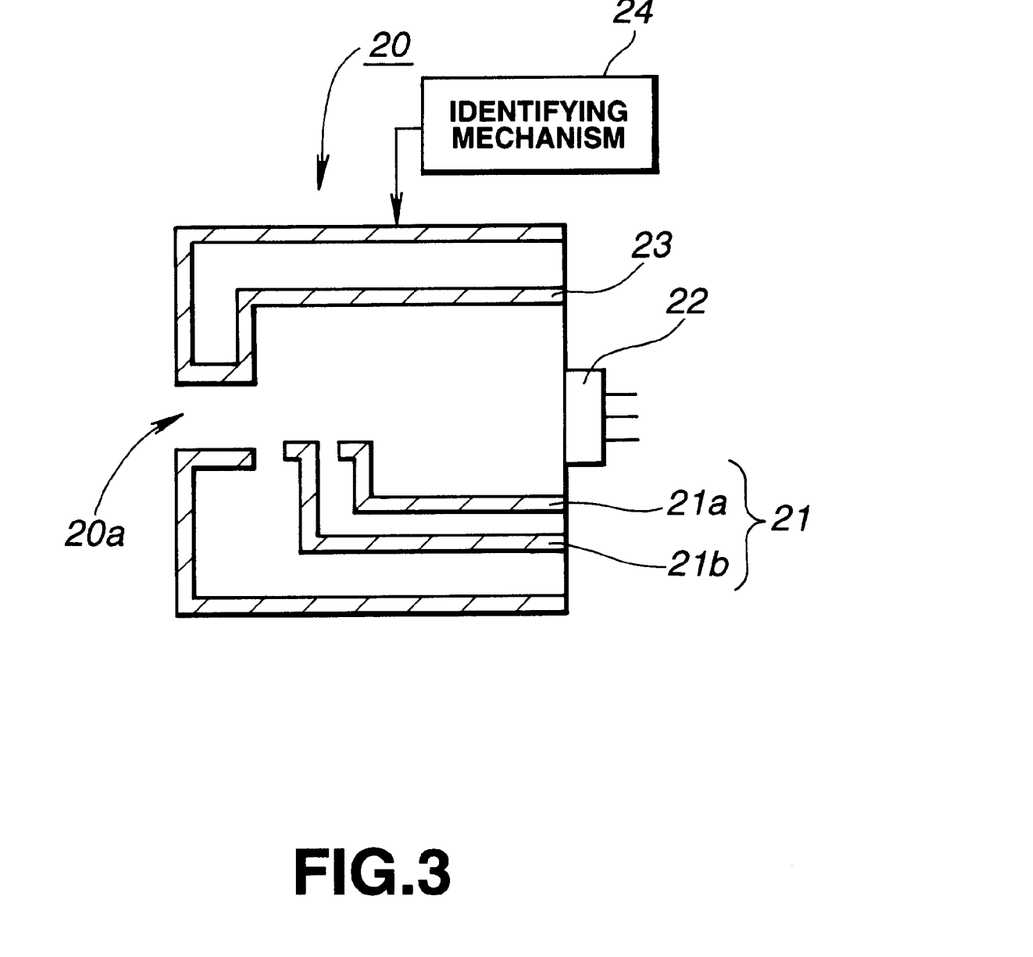
FIG. 3 is a side view showing a jack to which the invention of the present application is applied.

The jack 20 to be connected with this kind of plug, as shown in FIG. 3, provides an analog signal input portion 21 to which the analog signal is inputted and a digital signal input portion 22 made of a photo detector to which the digital signal is inputted. This jack 20 provides the GND terminal 23 located to come into contact with an insertion port 20a. In the case of outputting a light signal, this jack may be arranged so that a photo diode is located at the place of the photo detector 22.

This type of jack 20 has the substantially same form of the plug 2 composing the transmission cable 1 and may be connected with the second plug in which the terminal located on the side of the projection serves to output the analog signal. Then, this jack 20 provides an identifying mechanism 24 for identifying which of the first plug 2 and the second plug 10 is inserted.

As shown in FIG. 2, this identifying mechanism 24 is composed of plural detecting portions to be discussed below and serves to identify the type of the plug to be inserted to the jack 20. This detecting portion is made of a terminal, for example and comes into contact with the plug inserted thereto for detecting an electric signal. The detecting portion serves to apply the detected signal into the recording device (to be discussed below).

This jack 20 is inserted with the foregoing three types of plugs as the plug of the transmission cable connected with the insertion port 20a.

The first plug 2, the second plug 10, and the third plug 11 are formed to have the substantially same outer diameter as the jack 20. That is, any plug may be correctly inserted to and connected with the insertion port 20a shown in FIG. 2.

The second plug 10 or the third plug 11 is basically composed of two portions. The first portion corresponds to the area A shown in FIG. 2. It has a relatively small diameter and is tapered. On the other hand, the second portion corresponds to the area B, the area C, and the area D shown in FIG. 2. It has a larger diameter than the portion of the area A and keeps its diameter constant.

In the interior of the jack 20, a detecting portion 25 is located at the place corresponding to the area A, while a detecting portion 26 is located at the place corresponding to the area B. A detecting portion 27 and a detecting portion 28 are located at the place corresponding to the area C, and a detecting portion 29 is located at the place corresponding to the area D. The signals detected at the detecting portions are applied into a CPU 50 included in the recording device (to be discussed below).

In the case of inserting the first plug 2 or the second plug 10, the detecting portion 25 operates to apply the output from the Lch terminals 6 and 10a into the CPU 50 as the first output A, while the detecting portion 26 operates to apply the output from the Rch terminals 7 and 10b into the CPU 50 as the second output B. The signals outputted from the detecting portions 25 and 26 are analog information signals, for example. If this identifying mechanism 24 determines the analog signal is inputted, the detecting portions 25 and 26 detect the information signals.

A given value Vc is applied into the detecting portion 27 through a resistor 31. The detecting portion 28 is grounded and serves to output the third output C. The detecting portion 28 may be traveled. When the plug is inserted into the insertion port 20a, the detecting portion 28 is pressed by the area C so that it may come into contact with the detecting portion 30. When the plug is pulled out of the insertion port 20a, the detecting portion 28 is released from the contact with the detecting portion 30. The signal detected by the detecting portion 30 is outputted as the fifth output E. The voltage Vc is applied to the detected signal through a resistor 32. The detecting portion 29 is composed so that the signal from the area D is outputted as the sixth output F. The voltage Vc is applied to the sixth output F through the resistor 33.

When the plug is inserted into the insertion port 20a or pulled out of the insertion port, the fourth output D to the sixth output F are changed as listed in Table 1.

TABLE 1

|  | E | D | F |
|---|---|---|---|
| First Plug or Second Plug | L | L | L |
| Third Plug | L | H | H |
| None | H | H | H |

The "L" in the table 1 indicates that the signal outputted from each detecting portion is substantially zero. The "H" in the table 1 indicates that the signal outputted from each detecting portion is Vc.

That is, when the first plug 2 or the second plug 10 is inserted into the insertion port 20a, the detecting portion 27 is pressed by the area C that is a conductive portion. Then, the detecting portion 27 is grounded through the detecting portion 28. Hence, the logic L is outputted from the fourth output D. Since the detecting portion 28 comes into contact with the detecting portion 29, the logic L is detected in the fifth output E connected to the detecting portion 30. The detecting portion 29 is connected to the area D and the area D is a conductive portion like the area C. The detecting portion 29 is integrally composed with the area D. Hence, the detecting portion 29 is grounded through the detecting portion 28. By this connection, the logic L is detected from the sixth output F connected to the detecting portion 29.

Next, in the case of inserting the third plug 11 into the insertion port 20a, the areas B to D are composed of non-conductive portions, so that the detecting portion 27 is in the floating state. The voltage Vc is outputted from the fourth output D through the resistor 31. This results in allowing the fourth output D to supply a signal at the logic H. Further, the detecting portion 28 is pressed by the non-conductive portion in the area B so that the detecting portion 28 comes into contact with the detecting portion 30. This results in allowing the fifth output E to supply a signal at the logic L. Moreover, the detecting portion 29 comes into contact with the non-conductive portion, so that the detecting portion 29 is in the floating state. This results in allowing the sixth output to supply the voltage Vc through the resistor 33, thereby leading to allowing the sixth output F to supply a signal at the logic H.

On the other hand, in the case of not inserting the plug to the insertion portion 20a, the detecting portion 27 is in the floating state, so that the fourth output may become a signal at the logic H. Since the detecting portion 28 is not pressed by the plug, the detecting portion 28 is spaced from the detecting portion 30, so that the voltage Vc is applied to the fifth output E through the resistor 32. This results in allowing the signal at the logic H to supply to the fifth output E. Further, since the detecting portion 29 is in the floating state, the voltage Vc is applied to the sixth output F through the resistor 33, thereby allowing the signal at the logic H to be supplied at the sixth output F.

As described above, when the logic of E that corresponds to the fifth output is at the level H, it is understood that no plug is inserted into the insertion portion 20a. In other words, when the fifth output E has a logic L, it is understood that the plug is inserted into the insertion port 20a.

In the case of inserting the plug into the insertion port 20a, it is determined as listed in Table 1.

That is, when the first plug 2 or the second plug 10 is inserted into the insertion port 20a, both the fifth output E and the sixth output F have the logic L. In the case of inserting the third plug into the insertion port 20a, the fifth output E has a logic L and the sixth output F has a logic H. Based on these logics, it is identifies which of the first plug 2, the second plug 10 and the third plug 11 is to be inserted. Then, by inputting the fifth output E and the sixth output F into the identifying mechanism 24, this jack 20 enable to determine which of the plugs is inserted.

This jack 20 is inputted with the analog signal inputted to the recording device by connecting the detecting portion 25 and the detecting portion 26 to the Lch terminal and the Rch terminal of the first plug 2. On the other hand, the light signal outputted from the first plug 2 is detected by the photo diode and then is inputted into the recording device.

Hence, even in the case of inserting the transmission cable with the first plug 2 or the transmission cable for transmitting only an analog signal, this jack 20 is served to apply the signal sent on the inserted transmission cable into the recording device.

However, the jack 20 disables to determine which of the transmission cables is inserted, that is, if the transmission cable for transmitting only the analog signal or the transmission cable with the first plug 2 is inserted. As described above, since the first plug 2 cannot be identified from the second plug 10, it is not determined if the signal is received in the digital or analog manner.

The recording device provided with the jack 20 employs a SCMS (Serial Copy Management System) as well as provides a PLL (Phase Locked Loop) circuit, for the purpose of determining if the inputted signal is a digital light signal or an analog light signal.

That is, this recording device operates to determine if the inputted signal is a digital signal or an analog signal as listed in Table 2.

TABLE 2

|  | COPY OK | COPY NG |
| --- | --- | --- |
| PLL LOCK | Digital Input | Analog Input |
| PLL UNLOCK | Analog Input | — |

In this recording device, when the digital light signal is inputted from the jack 20 to the recording device, the digital light signal is inputted to the PLL circuit. If the PLL circuit is locked by the input of the light signal, it indicates that the information signal does not contain a prohibit code and thus the copy of the information is not prohibited by the SCMS. As listed in Table 2, it is determined that the digital light signal is inputted. On the other hand, in the case of not locking the PLL circuit, it is determined that only the analog signal is transmitted. As listed in Table 2, the input of the analog signal is determined.

Moreover, in the case of inputting the digital information signal, a flag is set to the digital signal which has been already dubbed onto another recording medium. The PLL circuit may be locked but the copy of the signal to the second generation is prohibited. Hence, the digital dubbing is prohibited and the signal is inputted as the analog information signal into the recording device. In the case that the flag is set to the digital signal, the signal is determined as the analog signal, so that this recording device prohibits re-dubbing of the digital information signal.

As described above, since the recording device employs the SCMS and applies the inputted signal into the PLL circuit, the recording device enables to determine if the inputted signal is a digital signal or an analog one.

Hence, if the inputted digital signal contains the SCMS prohibit code, this recording device determines as described above. It means that the recording device enables to automatically switch the recording system from the digital system to the analog one, thereby improving the operativity. If the SCMS prohibit code is not contained in the inputted signal, this recording device enables to automatically select the digital signal with more excellent sound quality than that of the analog signal. In addition, as stated above, even in the case of automatically selecting the digital signal, the user may select the analog signal rather than the digital signal by operating the recording device 40 from the outside.

As described above, this recording device provides a capability of receiving and transmitting a digital signal as well as an analog signal. For example, if the dubbing of the digital signal is prohibited, the text information may be digitally dubbed, while the information signal may be analogously dubbed. Further, this recording device provides another capability of dubbing the digital signal as image information and the analog signal as audio information.

In turn, the description will be oriented to the recording device providing a capability of dubbing the signal recorded on the recording medium loaded on another recording device onto the recording medium loaded on the present recording device. The recording device to be described below is a magneto-optical disc drive. In actual, the recording device may be any recording medium for reproducing the information signal.

Figure 4:
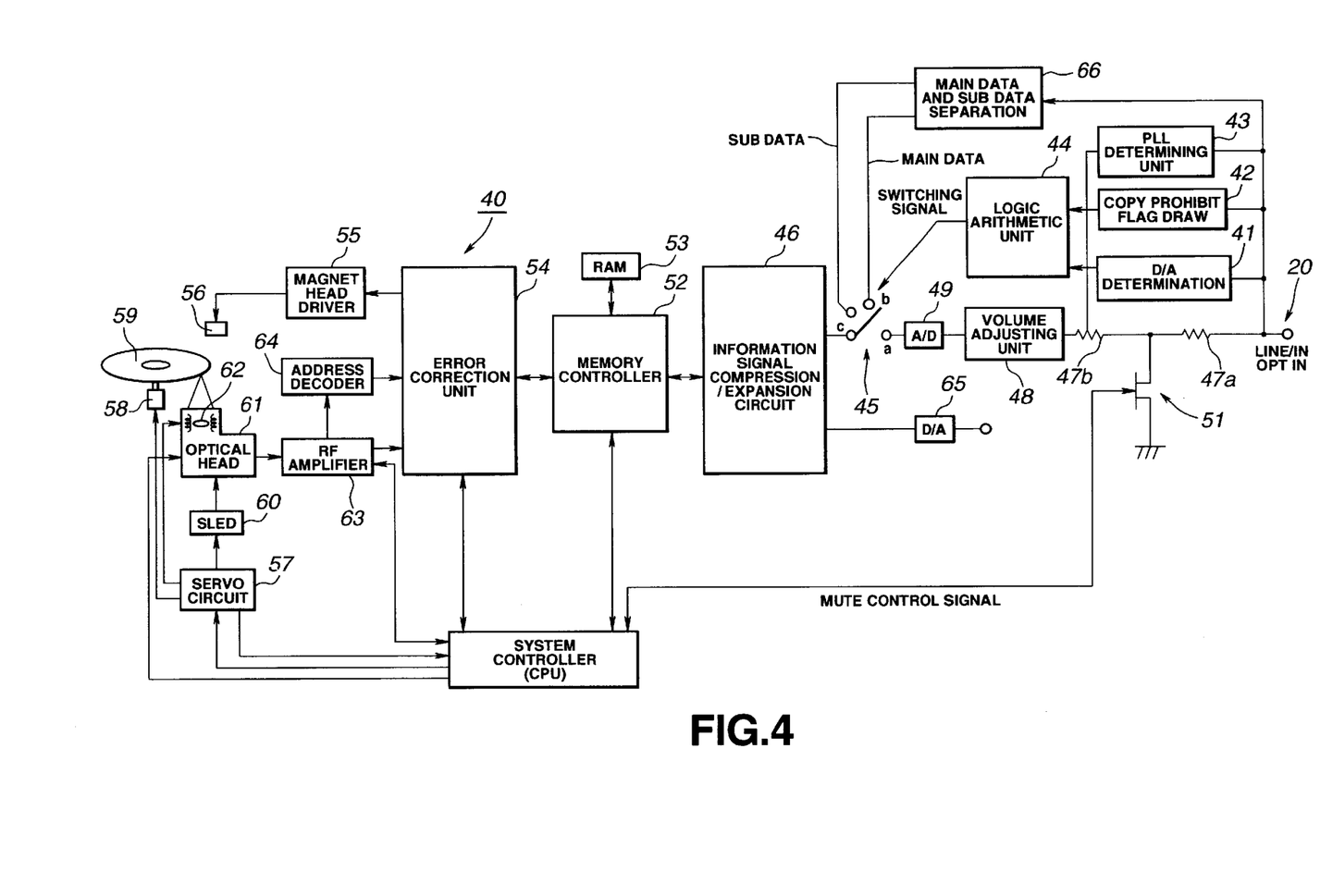
FIG. 4 is a block diagram showing a recording device to which the invention of the present application is applied.

As shown in FIG. 4, if the signal inputted from the jack 20 is a digital signal, this recording device 40 operates to apply the digital signal into a D/A determining unit 41, a copy prohibit flag drawing unit 42, and a PLL determining unit 43.

The D/A determining unit 41 is inputted with a signal outputted from the identifying mechanism 24 that is one of the components of the jack 20 and an output from the photo detector 22 provided in the jack 20. Then, the D/A determining unit 41 operates to apply the signal inputted to the jack 20 into a logic arithmetic unit 44.

The copy prohibit flag drawing unit 42 is inputted with the digital light signal inputted from the jack 20. This copy prohibit flag drawing unit 42 operates to draw a copy prohibit flag from the digital light signal inputted thereto. Then, the signal from this copy prohibit flag drawing unit 42 is applied into the logic arithmetic unit 44.

The PLL determining unit 43 contains the PLL circuit to which the digital light signal is inputted from the jack 20. Then, the PLL determining unit 43 operates to determine if a flag is set to the inputted light signal. Next, the signal outputted from this PLL determining unit 43 is applied into the logic arithmetic unit 44.

As described above, the recording device 40 provides the D/A converting unit 41, the copy prohibit flag drawing unit 42, and the PLL determining unit 43. The logic arithmetic unit 44 operates to determine if the inputted signal is a digital signal or an analog signal. Then, if the inputted signal is the digital one, the arithmetic logic unit 44 operates to supply a switching signal for turning the switch circuit 45 to the terminal b side, while if the inputted signal is the analog one, the arithmetic logic unit 44 operates to supply a switching signal for turning the switch circuit 45 to the terminal a side.

If the logic arithmetic unit 44 determines that the inputted signal is the digital one, the digital signal passes through the terminal b side of the switch circuit 45 and then is applied into the information signal compression/expansion circuit 46.

On the other hand, if the jack 20 or the logic arithmetic unit 44 operates to determine that the inputted signal is the analog signal, the switch circuit 45 is turned to the terminal a side. Then, the signal inputted from the jack 20 is passed through resistors 47a and 47b and then is applied into a volume adjusting unit 48 and then into an A/D converting circuit 49. Then, the signal inputted into the A/D converting circuit 49 is converted from the analog signal into the digital signal. The digital signal is passed through the switch circuit 45 and then is applied into the information signal compression/expansion circuit 46. Herein, the signal inputted into the volume adjusting unit 48 is controlled by inputting or outputting a Mute control signal from a system controller (referred to as a CPU) 50 into an FET 51.

In turn, the signal passed through the switch circuit 45 is applied into the information signal compression/expansion circuit 46. Then, the information compression/expansion circuit 46 operates to compress the inputted signal and then output it to the memory controller 52. The signal inputted into this memory controller 52 is temporarily stored in a RAM 53 and then is applied into an error correction unit 54 through the memory controller 52 according to the signal from the CPU 50.

This error correction unit 54 employs a CIRC (Cross Interleave Reed Solomon Code) system error correction system and operates to encode and decode the inputted signal in a modulating system called EFM (Eight to Fourteen Modulation).

The signal encoded by this error correction unit 54 is inputted into the magnetic head driving unit 55 for controlling the on and off of the magnetic head 56. The signal processed by this error correction unit 54 is applied into the CPU 50. The signal inputted into the CPU 50 is then applied into the servo circuit 57.

The servo circuit 57 operates to drive a spindle motor 58 according to the signal inputted from the CPU 50 and drive a recording medium 59 at a given number of rotations. The servo circuit 57 operates to drive an optical head 61 in the radial direction of the recording medium 59 by driving a sled 60 and drive an actuator in the focusing and the tracking directions so as to form a spot of a given size on a predetermined track. Then, this optical head 61 operates to focus a laser beam on the recording medium 59 through the effect of an objective lens 62 according to the signal from the CPU 50. By this operation, the signal inputted from the jack 20 is recorded on the recording medium 59.

On the other hand, when reproducing the information recorded on the loaded recording medium 59, the reflected light of the laser beam focused by the objective lens 62 provided in the optical head 61 is detected by a photo detector and then is applied into a RF amplifier 63. Then, the address information of the signal applied into the RF amplifier 63 is inputted into an address decoder 64 and the recording information of the signal is inputted into the error correction unit 54. The signal passed through the error correction unit 54 passes through the memory controller 52 and reaches the information signal compression/expansion circuit 46. The signal is decoded in the circuit 46 according to the reproduction program stored in the RAM 53 and then passes through the D/A converting circuit 65 before it is outputted.

This type of recording device 40, as stated above, provides a capability of transmitting and receiving the information signal as well as additional information such as text information. As the method for transmitting and receiving this kind of additional information, it is possible to refer to the method for controlling the I/O of the digital signal from the jack 20 and transmit the signal in the format of the asynchronous system UART (Universal Asynchronous Receive Transmitter). Further, the additional information such as text information may be transmitted or received with the text information put on an empty bit (referred to as a subcode) of a signal format of a digital audio interface.

The digital signal transmitted from the jack 20 is separated into main data and sub data by a main data and sub data separating circuit 66.

It is considered that the sub data separated by the main data and sub data separating circuit 66 is transmitted on the following procedure.

For example, in a case that the sub data is an album title about the recording medium or a tune name against a tune number, the sub data is normally recorded on a TOC area located on the innermost periphery of the recording medium loaded onto the reproducing device.

Hence, since the reproducing device operates to reproduce the normal program area after reproducing the TOC area. When starting the dubbing, the switch SW45 is turned to the terminal C and the sub data is put into the memory located in the recording device. Then, the switch SW45 is turned to the terminal a or b. If the digital dubbing prohibit flag is set, the switch SW45 is selectively turned to the terminal a, while if the digital dubbing prohibit flag is set, the switch SW45 is selectively turned to the terminal b.

Figure 5:
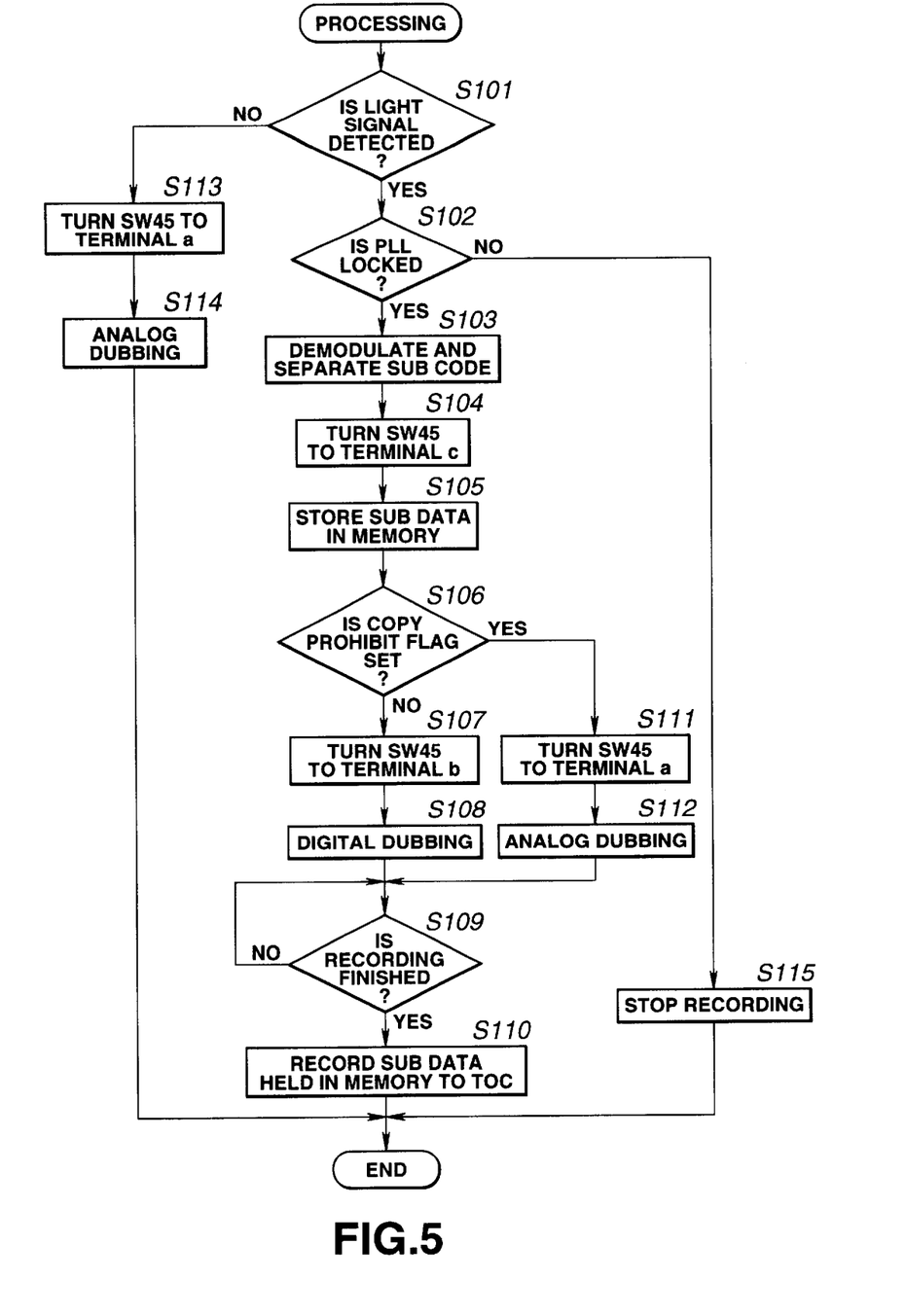
FIG. 5 is a flowchart showing a procedure executed inside of the recording device in dubbing to which procedure the invention of the present application is applied.

FIG. 5 is a flowchart showing a process for dubbing according to the invention of the present application.

As the procedure, at a step S101, for determining if the plug inserted into the jack 20 is the third plug 11 dedicated for a digital signal, the second plug 10 dedicated for an analog signal, or the first plug 2 dedicated for an analog and a digital signals, it is determined if the light detector 22 shown in FIG. 3 detects a light signal.

If the light signal is not detected at the step S101, it is determined that the inserted plug is the second plug 10 dedicated for an analog signal, the switch 45 is turned to the terminal a and then the analog dubbing is started (Steps S113 to S114).

If the light signal is detected at the step S101, it is determined that the inserted plug is the third plug dedicated for a digital signal or the first plug 2 dedicated for an analog and a digital signals. Since it is certain that the light signal is transmitted, the determining unit 43 determines if the PLL is locked (step S102).

If the PLL is locked at the step S102, the main data and sub data separating circuit 66 shown in FIG. 4 operates to demodulate the digital data and separate the data into the main data and the sub data (step S103).

Since it is certain that the sub data is supplied on a light transmission path, at a step S104, the switch SW45 is turned to the terminal C and at a step S105 the sub data is stored in the memory.

In starting the dubbing, the TOC information read by the reproducing device for the first time is supplied as the sub data. The sub data is stored in a memory RAM 53 or a memory (not shown) located inside of the system controller CPU 50, for example. Then, at a step S106, it is determined if a copy prohibit flag is contained in the digital data supplied on the light transmission path.

If no copy prohibit data is contained in the digital data at the step S106, it is determined that the digital dubbing between the first generations is started. Then, the switch SW45 is turned to the terminal b so that the digital main data and the sub data are supplied on the light transmission path. The digital dubbing is started (step S108).

If the copy prohibit flag is contained in the digital data at the step S106, it is determined that the digital dubbing between the second or subsequent generations is started. Then, the switch SW45 is turned to the terminal a so that the analog signal is temporarily converted into the digital signal through the effect of the A/D converter 49 shown in FIG. 4 before recording the digital signal (steps S111 and S112).

At a step S109, it is determined if the analog dubbing or the digital dubbing is terminated. If it is determined that the recording is terminated, at the step S110, the sub data such as text information held in the memory in advance is recorded on the TOC area that corresponds to the area for managing the recording medium.

As is clear from the above given explanation, the transmission cable according to the present invention includes a plug having a hole formed at the tip of a projection located on the center thereof and through which a digital signal is inputted and outputted and a terminal section located on the side of the hole and for outputting an analog signal, a digital signal transmission line for transmitting a digital signal to be inputted or outputted from the hole, and an analog signal transmission line for transmitting an analog signal to be inputted or outputted from the terminal section. This transmission cable enables to transmit the analog signal as well as the digital signal at a time. Consequently, according to the transmission cable, a user need not replace the transmission cable when carrying out dubbing in an analog system or in a digital system.

The jack according to the present invention includes a first plug through which the digital signal and the analog signal are inputted and outputted, a second plug having the substantially same form as the first plug and through which only the analog signal is inputted and outputted, an analog signal I/O portion selectively connected with a third plug through which only a digital signal is inputted and outputted and through which the analog signal is inputted and outputted, a digital signal I/O portion through which the digital signal outputted from the first plug is inputted and outputted, and identifying means for identifying which of the first plug, the second plug and the third plug is inserted. The jack provides a capability of transmitting and receiving both the analog signal and the digital signal. Consequently, according to the jack, by using a transmission cable provided with a first plug for outputting a digital signal and an analog signal, a user need not replace the transmission cable when carrying out dubbing in an analog system or in a digital system.

Further, the recording device according to the present invention includes a jack to be selectively connected with a first plug through which a digital signal and an analog signal are inputted and outputted, a second plug having the substantially same form as the first plug and through which only the analog signal is inputted and outputted, and a third plug through which only the digital signal is inputted and outputted, an analog signal I/O portion to which the analog signal inputted or outputted from the first or the second plug is inputted, a digital signal input unit to which the digital signal inputted or outputted from the first or the third plug is inputted, identifying means for identifying which of the first, the second and the third plugs is connected, converting means for converting the inputted signal into a recording signal to be recorded on the recording medium according to the identified result of the identifying means, and recording means for recording the recording signal converted by the converting means onto the recording medium. The recording device may be inputted with the analog signal transmitted thereto and inputted with or output the digital signal. Hence, this recording device enables to record any signal, that is, an analog signal or a digital signal onto the recording medium. Consequently, according to the recording device, by using a transmission cable provided with a first plug for outputting a digital signal and an analog signal, a user need not replace the transmission cable when carrying out dubbing in an analog system or in a digital system.

What is claimed is:

1. A jack comprising:
   a first plug having a hole formed at the tip of a projection located in the center and for outputting a digital signal and a terminal section located on the side of said hole and through which an analog signal is inputted and outputted;
   a second plug having the substantially same form as said first plug and a terminal located on the side of said projection and through which an analog signal is inputted and outputted;
   a third plug having a hole at the tip of said projection and from which hole a digital signal is inputted and outputted;
   one of said first to third plugs being selected connected to said jack;
   an analog signal I/O portion to be inputted with said analog signal;
   a digital signal I/O portion to be inputted with said digital signal outputted from said first plug; and
   means for identifying if any one of said first to said third plugs is inserted to said jack.

2. The jack described in claim 1, wherein said digital signal is a light signal and said digital signal I/O portion is a photo detector for detecting the light signal.

3. A recording device comprising:
   a jack being selectively connected to one of a first plug having a hole formed at the tip of a projection located in the center and for outputting a digital signal and a terminal section located on the side of said hole and through which an analog signal is inputted and outputted, a second plug having the substantially same form as said first plug and a terminal located on the side of said projection and through which an analog signal is inputted and outputted, a third plug having a hole at the tip of said projection and from which hole a digital signal is inputted and outputted;
   an analog signal I/O portion to be inputted with said analog signal outputted from said first plug or said second plug;
   a digital signal I/O portion to be inputted with said digital signal outputted from said first plug;
   means for identifying if any one of said first and second plugs is connected to said jack;
   means for converting an inputted signal into a recording signal dedicated to recording of a recording medium according to the identified result given from said identifying means; and
   means for recording said recording signal converted by said converting means onto said recording medium.

4. The recording device as claimed in claim 3, wherein if said identifying means determines that said first plug is connected, said converting means operates to convert an output signal from said digital signal I/O portion into said recording signal.

5. The recording device as claimed in claim 3, further comprising:
   means for extracting a prohibit signal for prohibiting duplicate of said digital signal inputted into said digital signal input portion;
   means for prohibiting duplicate of said digital signal according to said prohibit signal extracted by said extracting means; and
   means for controlling said recording means so that said analog signal is duplicated according to said prohibit signal extracted by said extracting means.

6. The recording device as claimed in claim 3, wherein said digital signal of the signals inputted from said first plug contains text information and said analog signal thereof contains audio signal.

7. The recording device as claimed in claim 3, wherein of the signals inputted from said first plug, said digital signal contains image information and said analog signal contains audio information.

8. The recording device as claimed in claim 5, wherein said digital signal contains management information for managing duplicate of a signal.

* * * * *

UNITED STATES PATENT AND TRADEMARK OFFICE
CERTIFICATE OF CORRECTION

PATENT NO.    : 6,262,958 B1
DATED         : July 17, 2001
INVENTOR(S)   : Akira Ogihara and Kissei Matsumoto It is certified that error appears in the above-identified patent and that said Letters Patent is hereby corrected as shown below:

<u>Title page,</u>
Item [54], Title, should read:

-- [54]  TRANSMISSION CABLE, JACK TO WHICH TRANSMISSION CABLE IS INSERTED, AND RECORDING DEVICE --

<u>Title page,</u>
Item [62], Related U.S. Application Data should read:

-- [62] Division of Application No. 09/071,772 Filed on May 4, 1998. --

Signed and Sealed this

First Day of April, 2003

JAMES E. ROGAN
*Director of the United States Patent and Trademark Office*